United States Patent [19]
Adams et al.

[11] 3,744,621
[45] July 10, 1973

[54] PALLET HANDLING APPARATUS

[76] Inventors: Lowell K. Adams, Route 2, Box 136; Mike Schump, 3505 Seeley Court, both of Greeley, Colo.

[22] Filed: Oct. 18, 1971

[21] Appl. No.: 190,127

[52] U.S. Cl.................. 298/221, 198/19, 198/75
[51] Int. Cl............................................ B65g 25/08
[58] Field of Search................... 198/75, 19, 221

[56] References Cited
UNITED STATES PATENTS

| | | | |
|---|---|---|---|
| 3,578,412 | 5/1971 | Martin | 198/19 |
| 3,385,418 | 5/1968 | Broser | 198/221 |
| 3,310,150 | 3/1967 | Southard | 198/40 |
| 2,789,678 | 4/1957 | Hickin | 198/19 |
| 3,048,258 | 8/1962 | Skold | 198/75 |

FOREIGN PATENTS OR APPLICATIONS
1,913,434   3/1969   Germany ........................ 198/221

*Primary Examiner*—Richard E. Aegerter
*Assistant Examiner*—Joseph E. Valenza
*Attorney*—J. Warren Kinney, Jr.

[57] ABSTRACT

Pallets of the type conveyed by fork lifts are lodged successively within a frame-like structure and stored or accumulated therein until removed by fork lifts later; the structure being provided with pneumatic means at its entry and delivery ends, for automatically advancing and positioning pallets at the delivery end for quick and easy removal, irrespective of the rate or frequency of pallet delivery to the entry end of the frame structure.

29 Claims, 10 Drawing Figures

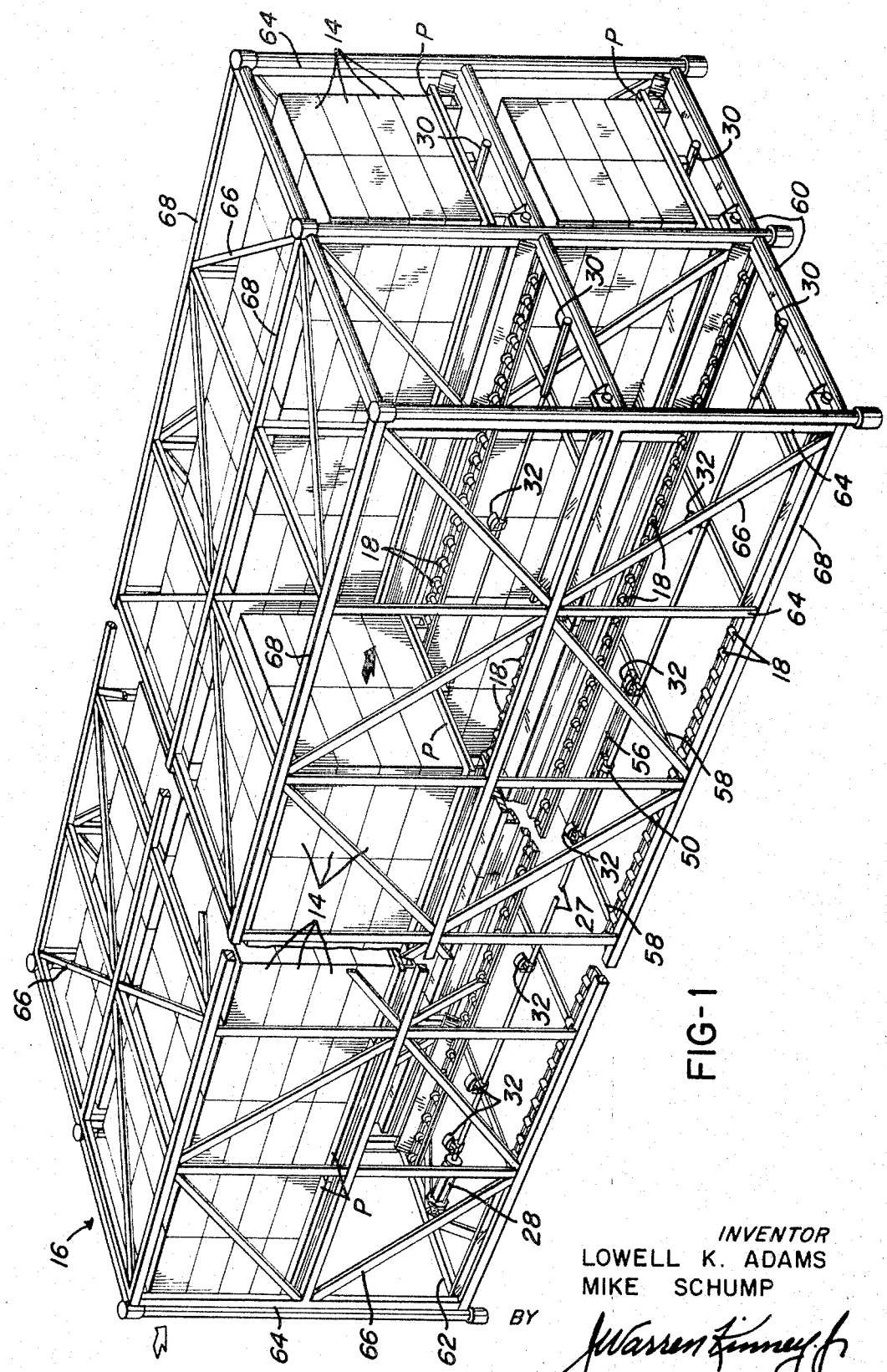

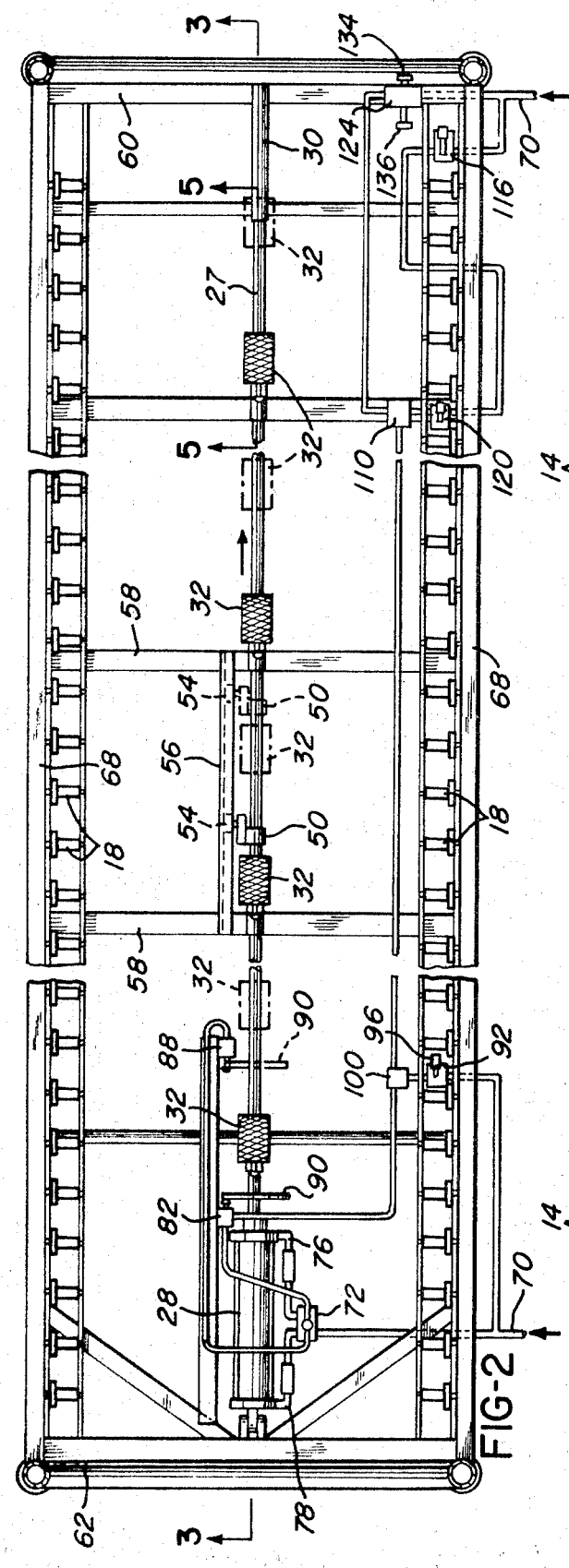
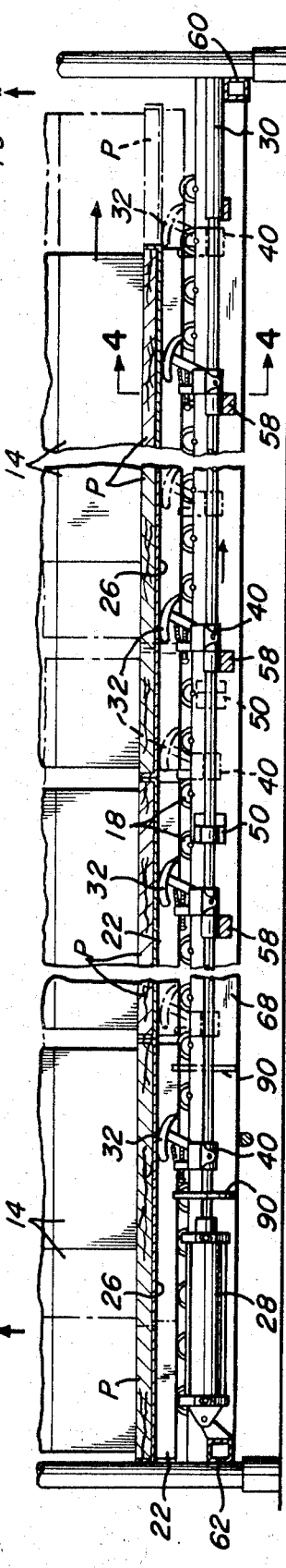
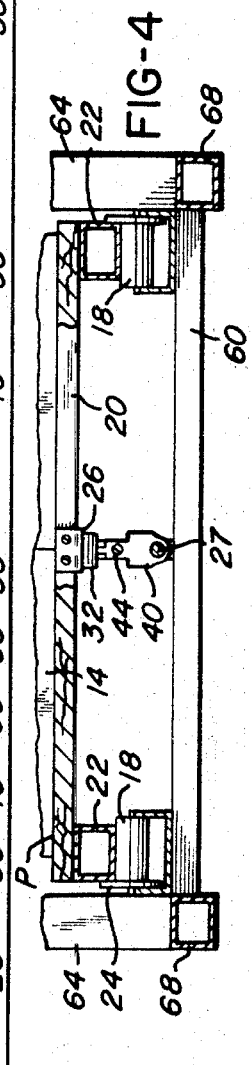

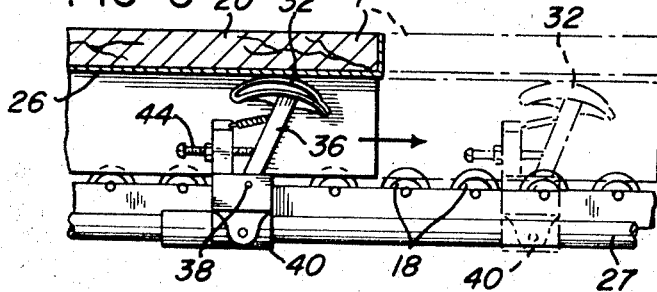
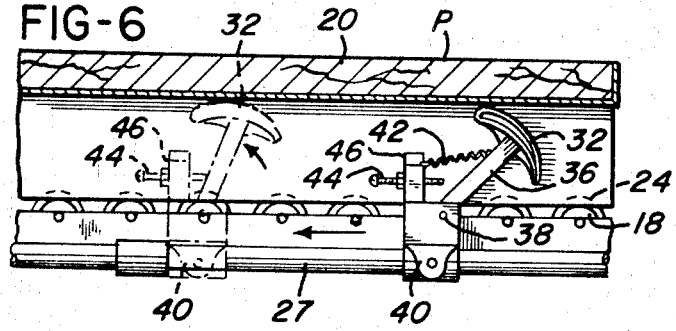
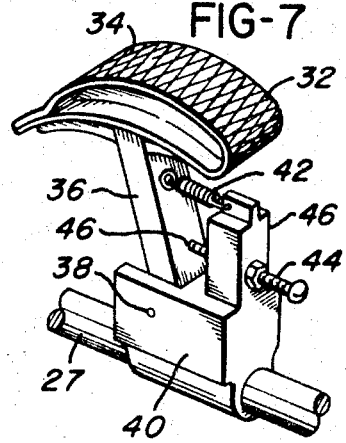
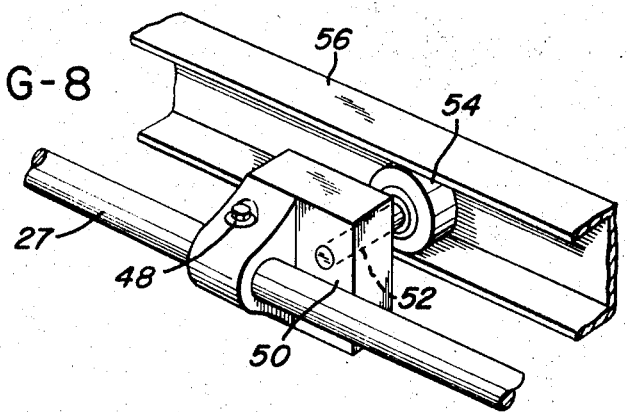
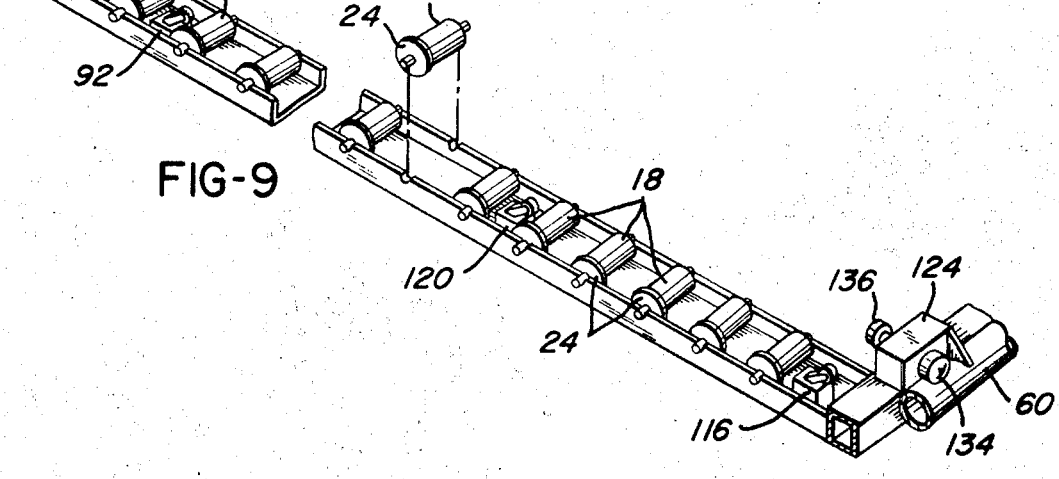

PALLET HANDLING APPARATUS

BACKGROUND OF THE INVENTION

Pallets with merchandise stacked thereon are generally moved about, sorted, and temporarily stored in warehouses or other storage yards, with the aid of wheeled fork lifts the fork of which enters beneath a pallet and lifts it from a floor or other supporting surface of transport to any desired location, or to a vehicle bed, freight car, other carrier, etc.

In the ideal situation, the fork lift removing loaded pallets from one vehicle, would transfer them immediately to a second vehicle for local delivery to a point of destination; however, said second vehicle is not always immediately available for effecting the transfer, wherefore it becomes necessary to store the loaded pallets for a time. This in turn raises the problem of keeping segregated from other pallets, those in storage which are to be delivered to one destination or another. In busy yards or warehouses the in-and-out movement of merchandise is nearly continuous, and requires great skill and methodical handling of merchandise to avoid loss and mistakes in dispatching the same.

THE PRIOR ART

So far as presently known, the prior art has proposed a pallet-receptive frame for purposes of segregation and temporary storage, wherein loaded pallets move by gravity from the entry end to the delivery end of the frame, along inclined rails or tracks which support the pallets. Such prior art devices are objectionable for various reasons, one of which was its tendency to permit pallet immodility at some points within the frame structure, due usually to frictional binding or restraint, with the likelihood of sudden or unexpected release of the pallet and rapid gravitation to the delivery end of the frame. If the released pallet gained sufficient speed or struck with force another pallet ahead, it would likely damage, or at least dump the merchandise or disable the apparatus to a considerable extent, thereby rendering the apparatus inoperative. The gravity feed apparatus, moreover, posed serious safety problems for the men using it, and for other workmen in the vicinity.

SUMMARY OF THE INVENTION

The present apparatus comprises one or more long passageways each having a pair of spaced parallel tracks to support a number of pallets disposed end to end, the tracks being substantially horizontal and therefore not inducive to gravity advancement of the pallets thereon. The passageways in which the pallets move, may be parallel to one another, and some may be superposed upon others in a suitable framework to provide a plurality of long passageways or decks at different elevations, as shown.

Each passageway has an open entry end for receiving pallets, and an opposite open delivery end through which pallets may be removed bodily, as by means of a fork lift vehicle. Pallets with their loads are adapted to be advanced along a passageway in a step-by-step manner, in response to the application of a positive force individually applied to each pallet, from the entry end to the delivery end of each passageway. Such stepping advancement of the pallets is automatic, and proceeds as long as pallets are fed to the entry end of a passageway, and provided that the length of the passageway is not completely filled with pallets. When a passageway is filled to capacity with pallets, all pallet advancement is automatically terminated until at least the pallet is removed from the delivery end thereof, whereupon the advancement of pallets is resumed automatically.

The apparatus may be operable by air pressure exclusively, if desired, and incorporates automatic safety features of benefit to persons involved with its use and presence in any warehouse or storage yard. By selective use of a plurality of passageways in feeding pallet merchandise thereto, merchandise may be kept sorted or grouped or methodically accumulated, for orderly recovery from the delivery ends of the passageways. Under this arrangement, loss of merchandise and errors in transshipment are reduced to a minimum.

A primary object of the present invention is to provide highly effective and reliable apparatus for the safe and orderly temporary storage of merchandise on pallets, while undergoing transshipment.

BRIEF DESCRIPTION OF THE DRAWINGS

FIG. 1 is a perspective view of the improved pallet handling apparatus, showing by way of example, four longitudinal passageways of which three contain loaded pallets.

FIG. 2 is a horizontal cross-section taken a short distance above the pallet-supporting roller track of a passageway and showing means for advancing pallets in one direction along the track, the pallets being omitted.

FIG. 3 is a vertical cross-section taken on line 3—3 of FIG. 2, and showing several loaded pallets in readiness for advancement.

FIG. 4 is a transverse cross-section taken on line 4—4 of FIg. 3.

FIG. 5 is an enlarged cross-section taken on line 5—5 of FIG. 2, indicating advancement of a pallet to the right by means of a shoe.

FIG. 6 is a view similar to FIG. 5, but showing the pallet advancing shoe on idle stroke and ineffective to move the pallet along its supportive roller track.

FIG. 7 is a detailed perspective view of one of several identical shoes or pushers for the pallets.

FIG. 8 is a detailed perspective view of an actuator rod guide, shown also at the middle of FIG. 2.

FIG. 9 is a perspective view of a section of pallet-supportive roller track.

DESCRIPTION OF THE PREFERRED EMBODIMENT

Figure 10:
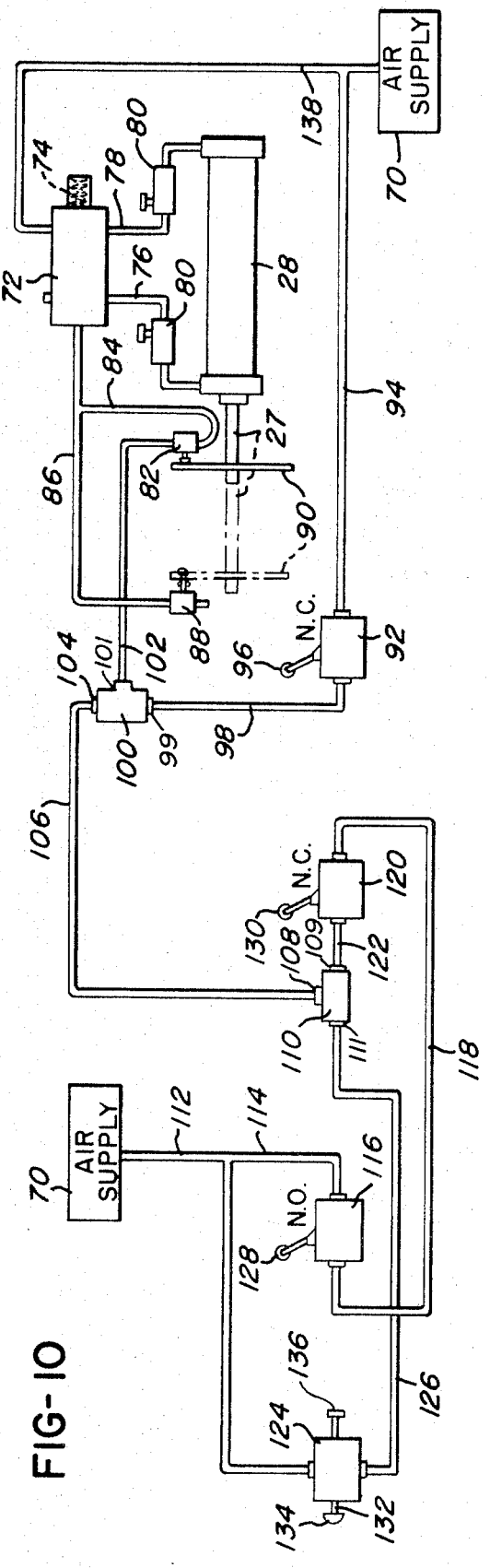
FIG. 10 is a diagram of a pneumatic system including valves and a power cylinder, for controlling movements of pallets along a passageway of the apparatus.

In the drawings, a number of pallets denoted P, carry goods or merchandise parcels 14 stacked thereon (FIG. 1), the loaded pallets having been fork-lifted and introduced into the open entry ends of a passageway, a plurality of which may be provided in a framework 16. In the example shown, four passageways are illustrated, three of which contain loaded pallets marked with arrows indicating the direction of pallet advancement, from left to right. The pallets are introduced at the left end of the frame, and will be advanced to the right end thereof in position to be fork-lifted from the frame to a waiting truck or other vehicle.

In the example illustrated, the pallets P in each of the frame passageways rest upon parallel roller trucks 18, 18, which facilitate their advancement from left to right, or from the entry end to the delivery end of each passageway. The roller tracks extend the full length of the passageways, and are substantially horizontal rather then inclined, to avoid gravitational advancement of pallets. In a typical installation, several tiers or different levels of passageways are provided for the purpose of conserving floor space in a storage yard or warehouse. The pallets are preferably, though not necessarily, of one size and shape. They must, of course, span the tracks 18, 18.

A typical pallet may consist of a flat bed 20 of wood or other material, having parallel side edges along which are secured metallic runners 22, 22, which rest upon the freely rotatable rollers tracks 18, 18. The rollers of track 18 may be flanged as shown at 24, to guide the pallet as it advances along a passageway from the entry end to the delivery end thereof.

Midway between the runners 22, 22 of the pallet, and in parallelism therewith, is secured a metallic wear strip 26 which extends from the forward edge to the rear edge of the pallet, along the underside of the pallet bed. The wear strip of each pallet is adapted for contact with a row of reciprocative shoes or pushers, which act upon the wear strip to advance the pallet along the roller track 18 in step-by-step fashion. Whenever a pallet reaches the delivery end of a roller track, it is subject to bodily displacement from the roller track by means of a tractional fork lift, which delivers the pallet and its load to a waiting forwarding vehicle or carrier.

The means employed for effecting step by step advancement of pallets lengthwise of a passageway, may comprise a long rigid plunger or actuator rod 27 extending substantially the full length of frame 16, and means for reciprocating the rod. The actuator rod may be longitudinally reciprocated by means of a double-acting pneumatic cylinder 28 located near one end of frame 16. At the opposite end of the frame a tubular bearing member 30 is provided in which the rod end is slidably supported.

At intervals along the length of actuator rod 27 are mounted a plurality of shoes or pushers 32, FIG. 7, each carrying a frictional facing meterial 34 to contact the wear strips 26 of the pallets. Shoe 32 is fixed upon one end of a lever 36, whose ooposite end is pivoted at 38 upon a bracket 40 which is fixedly mounted upon actuator rod 27. A tension spring 42 acts constantly to elevate lever 36 and shoe 32 about pivot 38, to an elevated position at which the shoe will impinge against the wear strip 26. The extent to which the shoe may be elevated, is controlled by an adjusting screw 44 that has a threaded mount in a portion 46 of bracket 40, and a free end 46 impinging against lever 36.

The mode of operation of the friction shoe is readily understood by referring to FIGS. 5 and 6. In FIG. 5, a movement of rod 27 to the right will be seen to increasingly wedge shoe 32 upwardly against pallet P, until the force of friction between the shoe and the pallet is great enough to enforce movement of the pallet with the shoe in the direction of rod advancement. The pallet thereby will be advanced a distance approximately equal to the advancing stroke of the plunger. Then as the plunger is power retracted to the left, FIG. 6, shoe 32 will tilt away from the pallet underside, while the pallet remains stationary due to a lack of frictional engagement of the shoe sufficient to induce retractile movement of the pallet.

That is, when rod 27 in FIG. 6 is driven to the left by cylinder 28, all shoes mounted on that rod will merely skid lightly along the wear plates of any overlying pallets, without moving the pallets. On the other hand, advancement of plunger 27 to the right, will force the series of shoes strongly upwardly against any pallets overlying them, for simultaneously advancing all such overlying pallets.

FIGS. 2 and 8 disclose a form of means to lend rigidity to and control twist or torque of rod 27 intermediate its ends. Upon the rod is fixedly mounted, as by means of screw 48, a guide block 50 which carries a laterally projecting pin or axle 52. A roller 54 is mounted rotationally upon axle 52, and rides in a stationary guide channel 56 supported by a stationary part of frame 16. As shown, channel 56 is secured at its opposite ends to transverse braces or struts 58, 58 which serve to rigidify the frame and maintain the roller tracks 18, 18 in spaced parallelism. If the frame of the apparatus is one which is very long and accommodates a great number of pallets, it may be desirable to additionally support the rod at several locations intermediate the ends thereof, using the means of FIG. 8 or equivalent guide means.

FIG. 9 shows details of one of the roller tracks 18 for support of pallets P, and includes a showing also of several valve actuators and valves to be referred to hereinafter. The cross-member 60 shown, is located at the pallet delivery end of the apparatus frame, and supports the plunger guide tube 30, FIG. 3. A cross-member 62 at the opposite end of the frame defines the entry end of the frame and a passageway for pallets associated therewith.

In addition to the cross-members 58, 60, 62, other substantially similar cross-members are utilized to rigidify the frame, which includes also various uprights 64, struts 66, and horizontal rails 68 defining pallet tunnels or passageways in which the pallets advance along their respective roller tracks. The pallets P at the right end of FIG. 1, and shown at two different levels, are in position to be fork-lifted bodily from the frame in a direction longitudinally of said frame.

Pallets with their loads are adapted to be advanced step by step, from the entry end to the delivery end of each passageway, with a positive drive means. Stepping advancement of the pallets is automatic, and proceeds as long as pallets are fed to the entry end of a passageway, and provided that the passageway is not completely filled with pallets. When any passageway is filled to capacity with pallets, all pallet advancement ceases automatically until the endmost pallet is removed from the delivery end of the passageway, whereupon the advancement of pallets is resumed automatically until full capacity again is reached.

Means for controlling the aforesaid advancement of pallets, may comprise the mechanism of FIG. 10, or equivalent means. In FIG. 10, supply of air under pressure is denoted 70. A single source of supply may be substituted for the two sources shown in the diagram. At 72 is indicated a four-way air-operated spring return valve, preferably a spool valve, biased to the left in FIG. 10 by a compression spring 74. Two delivery ports of valve 72 are connected to opposite ends of power cylinder 28 by means of pipes 76 and 78 in which are incorporated pressure regulating valves 80, 80.

At 82 is shown a two-way normally closed button-actuated spring return valve, which through pipes 84 and 86, will at times supply spool-shifting air to valve 72 for shifting the valve spool against the force of spring 74. A second normally closed button actuated valve 88 is a bleed valve for relieving or exhausting pressure in pipe 86 to permit shifting of the spool of valve 72 by compression spring 74.

Upon plunger 27 is fixedly mounted an abutment member 90 adapted to depress and open either of the valves 82 or 88, depending upon the position of the plunger. As shown by full lines in FIG. 10, plunger 27 is fully retracted causing actuator 90 to open the valve 82. A full advancement of the plunger as denoted by broken lines, places the actuator in position to open the normally closed valve 88.

Valve 92, FIG. 10, is a normally closed spring-loaded valve connected in air supply pipe 94, said valve having an actuator arm 96 located at the entry end of a frame tunnel (at left in FIGS. 2 and 3), so that a pallet placed upon the entrance end of a passageway will automatically depress arm 96 and thereby open valve 92. By means of a pipe 98, valve 92 will supply air to intake port 99 of an automatic shuttle valve 100. Valve 100 has its outlet port 101 connected to a pipe 102 for supplying pressured air to valve 82.

The remaining inlet port 104 of shuttle valve 100 has connection with a pipe 106 which connects with the outlet port 108 of a shuttle valve 110. shuttle valves, as commonly known, have a single outlet port and two inlet ports, either of which inlet ports may supply pressured fluid to the common outlet port of the valve.

Pressure of fluid is directed from air supply 70 to inlet port 109 of shuttle valve 110, through pipes 112 and 114, valve 116, pipe 118, valve 120, and pipe 122. Alternatively, air may be supplied to the inlet port 111 of valve 110 through pipe 112, valve 124, and pipe 126.

Valve 116, which includes a spring biased actuator arm 128, is a normally open valve for delivering pressured air to the normally closed valve 120 through pipe 118. Valve 120 includes an actuator arm 130, which when depressed will open this valve to feed through pipe 122, inlet port 109 of shuttle valve 110. Valve 120 is spaced from the delivery terminus of a passageway, a distance slightly greater than the length of a pallet.

Valve 124 is a two-position valve having a longitudinally shiftable actuator stem 132. One head of the stem may carry a hand piece or buttom 134, whereas the opposite end may carry an actuator hzad 136. The arrangement of valve 124 is such that button 134 may be pressed manually to shift the stem 132 to the right, for opening the valve. The valve will remain open until force applied to head 136 shifts the stem to the left, for closing the valve. The valves 124, 116 and 120 are located near the delivery end of a tunnel, as will be explained in greater detail hereafter.

OPERATION OF THE APPARATUS

Whenever a pallet is introduced into the entrance end of a passageway and placed upon the roller track 18, the pallet will depress the actuator arm 96 of normally closed valve 92, to open said valve. Air will then flow from supply 70 through pipes 94 and 98 to shuttle valve 100 which releases the pressured air to pipe 102 and valve 82. Valve 82, being pressed open by abutment member 90, directs the air through pipes 84 and 86 to spool valve 72. The spool of valve 72 is thereby pressure-shifted to the right, against the force of spring 74, for allowing pressured air to flow from supply 70 through pipe 138, valve 72, and pipe 78, into the rear end of power cylinder 28 for advancing the plunger 27 and all of the friction shoes 32 mounted thereon.

Advancement of plunger 27 displaces the abutment member 90 from the operating button of valve 82, which is self-closing, so that air is trapped in pipes 84 and 86 to prevent any normalizing of valve 72 by spring 74; but when abutment member 90 strikes the operating button of bleed valve 88, the entrapped air is released thereby to atmosphere and spring 74 becomes operative to shift the spool of valve 72 to the left. Such shifting of the valve spool cuts off the supply of air to the rear of cylinder 28, and connects the air supply to the forward end of the cylinder through pipe 76, for retracting the plunger 27.

A full retraction of plunger 27 causes abutment member 90 to again strike and open valve 82, which initiates another advancement of plunger 27 and its shoes 32. Upon full advancement of the plunger, abutment member 90 will again open bleed valve 88 to effect reversal of the plunger movement. Thus, the plunger will reciprocate between limits of advancement and retraction as long as any pallet rests upon valve actuator arm 96 at the entry end of a tunnel, to keep valve 92 open.

By preference, though not of necessity, the stroke of plunger or rod 27 and the spacing of shoes thereon are a function of the length of a pallet so that three or four shoe advancements are needed in order to move a pallet a distance somewhat in excess of its length so that the pallet will be engaged by the next forward shoe by the time it is advanced from the preceding shoe. Accordingly, the pallets are subject to advancement in a step-by-step fashion.

After a pallet has been advanced sufficiently in step-by-step manner, it will clear actuator arm 96 of the normally closed valve 92, thereby to automatically terminate flow of air from supply 70 to shuttle valve 100, and no air will be available in pipes 98, 102, 84 and 86 for actuating the spool of valve 72. Accordingly, the entire pallet-advancing cycle will stop, unless actuated from the discharge end in a manner to by pass valve 92, as hereinafter set forth.

Whenever another pallet is lodged within the entrance end of a passageway, it will depress actuator 96 arm and open valve 92, to re-establish the pallet advancing cycle.

If the pallet-receiving passageway becomes filled to capacity, the foremost pallet upon reaching the delivery end of the tunnel will depress the actuator arm 128 of the normally open valve 116, thereby to close said valve and terminate flow of air from pipes 112 and 114 to pipe 118 and the normally closed valve 120, even though the actuator arm 130 of the normally closed valve 120 is depressed by a pallet for opening the valve. Therefore, no air pressure will be available in pipes 122, 106, and 102 to initiate cycling, until such time as the foremost pallet has been removed to effect an opening of valve 116. Upon removal of the foremost pallet, valve 116 will self-open, thereby to introduce pressured air through pipe 118, valve 120, shuttle valve 110, pipe 106, shuttle valve 100, pipe 102 to valve 82, thereby initiating the pallet-advancing cycle; it being noted that valve 92 will be closed as the last pallet is advanced beyond valve actuator arm 96.

The head 136 of the two-position hand-operative valve 124, is in the path of advancement of a pallet approaching the delivery end of a tunnel, and will be struck by such pallet when fully advanced. Said pallet thereby will move valve stem 132 to the left, for closing valve 124 and terminating flow of air from pipe 112 to pipe 126, shuttle valve 110, pipe 106, shuttle valve 100, pipe 102, valve 82, and finally the spool of valve 72, so that the cylinder 28 may not be activated in the direction of pallet advancement even though actuator arm 96 of the normally closed valve 92 is lowered for opening valve 92.

Should it become necessary or desirable to activate the pallet advancing mechanism when the passageways are but partially loaded with pallets, the hand button 134 of valve 124 may be manually depressed to move the valve stem to the right in FIG. 10, thereby to open said valve. the opening of valve 124 introduces operating air to valves 82 and 72 by way of pipe 126, shuttle valve 110, pipe 106, shuttle valve 100, and pipe 102, thereby causing cylinder 28 to reciprocate the plunger 27 forward and back repeatedly, with the shoes advancing the pallets, until such time as the foremost pallet strikes head 136 to close valve 124 and terminate the pallet-advancing cycle.

The actuator arm 128 of the normally open valve 116 is disposed at the discharge end of a passageway, whereas the actuator arm 130 of the normally closed valve 120 is located the length of a pallet plus one inch in advance of arm 128.

What is claimed is:

1. Apparatus for receiving, advancing, accumulating, and dispensing pallets, comprising a framework, a pair of elongate, laterally spaced, substantially horizontal and parallel pallet support rails on said framework defining an elongate passageway and having an entrance end and a delivery end, power operated pallet advancing means between and extending substantially the length of said rails in a position to engage the underside of a pallet supported on the spanning said rails to advance the pallet from the entrance end to the delivery end of the rails, said pallet advancing means comprising an elongate, reciprocable member below and between the rails, means connected with the reciprocable member to reciprocate the member, a plurality of spaced apart, pallet engaging means pivotally secured to said reciprocable member at intervals along the length thereof for tilting movement in the longitudinal plane of the reciprocable member, means connected with the pallet engaging means to prevent pivotal movement of the pallet engaging means in a first direction beyond a predetermined elevated position in frictional engagement with the underside of a pallet, so that reciprocation of the reciprocable member toward the delivery end of the rails causes the pallet engaging means to pivot upwardly and wedge against the underside of a pallet to advance the pallet toward the delivery end, and means connected with the pallet engaging means to enable pivotal movement of the pallet engaging means in a second direction upon reciprocation of the reciprocable member toward the entrance end of the rails to cause the pallet engaging means to tilt away from the underside of a pallet and move relative to the underside of a pallet, and control means on said framework operatively connected to said power operated pallet advancing means to control operation of said pallet advancing means and thus advancement of a pallet supported on said rails.

2. Apparatus as called for in claim 1, wherein antifriction means are secured to and carried by each of said horizontal rails for supporting the opposite sides of a pallet spanning said support rails.

3. Apparatus as in claim 1, wherein said framework includes a plurality of parallel elongate passageways, each having an open entrance end and an open delivery end through which pallets may pass horizontally.

4. Apparatus as called for in claim 1, wherein the means for reciprocating said elongate member comprises a double acting fluid motor.

5. Apparatus as called for in claim 4, wherein the control means for controlling said pallet advancing means comprises pallet-actuated means, including a normally closed valve having a normally elevated control arm in a position to engage and be lowered by a pallet placed on the entrance end of said support rails whereby fluid media will be admitted to the fluid motor for imparting reciprocation to said elongate member so long as pallet space remains on said support rails and said control arm is maintained in a lowered position by a pallet.

6. Apparatus as called for in claim 5, wherein a normally open valve having a normally elevated control arm adapted to engage and be lowered by a pallet is disposed at the delivery end of said support members whereby flow of fluid media to the fluid motor will be interrupted so long as the control arm of said normally open valve is maintained in a lowered position by a pallet.

7. Apparatus as called for in claim 5, wherein is included means independent of said normally closed valve, for initiating operation of the fluid motor to advance to said delivery end any pallets which may be disposed intermediate the entrance and delivery ends of the support members.

8. Apparatus as called for in claim 6, wherein the means last mentioned includes a valve subject to manual operation for initiating said fluid motor advancement, said manual valve being pallet-actuable to terminate feed of operating fluid to the motor upon movement of any pallet to the final delivery position.

9. Apparatus as called for in claim 1, wherein the means for imparting movement to said elongate member is powered by fluid under pressure.

10. Apparatus as called for in claim 1, wherein the means for imparting movement to said elongate member and for controlling the movements thereof, are powered exclusively by fluid under pressure.

11. Apparatus as defined by claim 3, wherein some of the passageways are disposed at different levels than others.

12. Apparatus as defined by claim 1, wherein the pallet engaging means comprises a series of reciprocative shoes having a shaped upper surface to frictionally engage the frictional propulsion area of the pallet beds, for propelling the pallets in step-by-step fashion along said tracks in one direction only.

13. Apparatus as defined by claim 12, wherein is included means to terminate reciprocative movement of the shoes whenever a passageway is filled to capacity with pallets.

14. Apparatus as defined by claim 12, wherein the stroke of reciprocation of each shoe is limited in length, to the extent that each shoe imparts to each pallet a plurality of successive impulses in advancing such pallet toward the delivery end of the passageway.

15. Apparatus as defined by claim 14, wherein is included means to temporarily terminate reciprocative movement of the shoes whenever a passageway is filled to capacity with pallets, and to restore such shoe movement incident to bodily removal of a pallet from the delivery end of the passageway.

16. Apparatus as defined by claim 1, wherein the control means includes both manual and automatic means to initiate the pallet propulsion.

17. Apparatus as defined by claim 1, wherein the control means includes automatic means dependent on the placement of a pallet within the passageway at the entrance end thereof, to initiate pallet propulsion.

18. Apparatus as defined by claim 17, wherein is included means to render inoperative said automatic means so long as a pallet occupies a position at the delivery end of the passageway.

19. Apparatus as defined by claim 12, wherein the means to reciprocate said shoes comprises a double-acting fluid-powered cylinder for reciprocating the elongate member.

20. Apparatus as defined by claim 19, wherein the stroke of reciprocation of the elongate member and each shoe is limited in length, to the extent that each shoe imposes upon each pallet a plurality of successive impulses in advancing each pallet toward the delivery end of the passageway.

21. Apparatus as defined by claim 20, wherein operation of the means of propulsion is dependent upon placement of a pallet within the passageway at the entrance end thereof.

22. Apparatus as defined by claim 20, wherein is provided manual means to initiate the pallet propulsion.

23. Apparatus as defined by claim 19, wherein the elongate member parallels the rails of the frame and approximates in length the length of a passageway.

24. Apparatus as defined by claim 20, wherein the elongate reciprocative member parallels the rails of the frame and approximates in length the length of a passageway.

25. Apparatus as defined by claim 24, wherein is provided manually operative means to initiate pallet propulsion irrespective of the presence of a pallet at the entry end or at the delivery end of a passageway.

26. Apparatus as defined by claim 13, wherein a plurality of passageways are on said framework, and some of the passageways are disposed at higher elevations than others.

27. Apparatus as defined by claim 20, wherein a plurality of passageways are on said framework, and some of the passageways are disposed at higher elevations than others.

28. Apparatus as defined by claim 23, wherein a plurality of passageways are on said framework, and some of the passageways are disposed at higher elevations than others.

29. Apparatus as defined by claim 1, wherein the elongate member is operative by pneumatic power exclusively.

* * * * *